Oct. 24, 1967    R. A. STARK ETAL    3,348,568
COATED CERAMIC CAPACITOR
Filed April 22, 1966

INVENTORS
RICHARD A. STARK
DAHER BARAKAT
BY
Robert Levine
ATTORNEY

United States Patent Office 3,348,568
Patented Oct. 24, 1967

3,348,568
COATED CERAMIC CAPACITOR
Richard A. Stark, Des Plaines, and Daher Barakat, Chicago, Ill., assignors to P. R. Mallory & Co. Inc., Indianapolis, Ind., a corporation of Delaware
Filed Apr. 22, 1966, Ser. No. 544,459
16 Claims. (Cl. 317—258)

ABSTRACT OF THE DISCLOSURE

A filed Epoxy Resin coating having corona suppressions and high Q value characteristics which extends the voltage operating range of ceramic capacitors.

The present invention relates to protective coatings for electrical components and more particularly to the means and methods for protecting ceramic capacitors.

Ceramic capacitors, or capacitors using ceramic materials as the dielectric, are widely used in electrical and electronic systems. They are especially attractive because they provide high capacitance and good breakdown voltage characteristics in relatively small packages.

When ceramic capacitors are operated above 500 volts, electrical noise and/or corona can be generated at points where a high voltage gradient exists. For instance, a ceramic capacitor of the type having a ceramic disc with metallized electrode areas on each side and lead wires attached to each electrode area will have corona paths existing between the lead wires and the ceramic disc and the edges of the electrodes and the ceramic disc. These corona paths may be blocked by suitable coatings. To date, however, coating materials having corona suppression characteristics suitable for blocking the aforementioned paths have exhibited low Q values. Since a coating over the capacitor described above will produce a parallel capacitor with the coating as the dielectric, a coating having a low Q values would degrade the final Q value of the ceramic capacitor.

The coating of the present invention has both excellent corona suppression characteristics and a high Q value. Therefore the coating of the present invention is an ideal means for extending the voltage operating range of ceramic capacitors. Other electrical components having portions which are subjected to high voltage gradients can also be protected with the coating of the present invention.

The coating of the present invention, which can be applied as an undercoating to a final capacitor coating, is an inexpensive means for extending the voltage operating range of ceramic capacitors. Final capacitor coatings may be provided to add strength to the structure of the capacitor or for cosmetic purposes.

It will be seen as this specification progresses that a coating having corona suppression characteristics and a high Q is a filled epoxy system. Various fillers in conjunction with the basic epoxy provides the special electrical properties of corona suppression and high Q values. The filled epoxy coating can be applied by dipping, spraying, brushing, or any other method normally used to apply such a coating. Thus, the coating of the present invention can readily be applied to all sizes and shapes of electrical components.

Other features and characteristics of the coating of the present invention will become apparent as this specification progresses.

It is an object of the present invention, therefore, to provide a coating for electrical components.

It is another object of the present invention to provide a coating for ceramic capacitors having good corona suppression characteristics and a high Q value.

It is a further object of the present invention to provide a ceramic capacitor having an extended voltage operating range.

It is yet another object of the present invention to provide a means for reducing the electrical noise and/or corona generated in ceramic capacitors.

It is still another object of the present invention to provide an undercoating for a ceramic capacitor which reduces the electrical noise and/or corona generated at higher voltages.

It is still a further object of the present invention to provide a ceramic capacitor which will operate satisfactorily at voltages greater than 500 volts.

It is another object of the present invention to provide a coating for electrical components which may be applied by dipping, spraying, brushing, or any other method normally used to apply such a coating.

It is another object of the present invention to provide a coating having a free-flowing characteristics for penetrating minute crevices in electrical components.

It is a further object of the present invention to provide an inexpensive coating for reducing electrical noise and/or corona generated by voltage gradients in electrical components.

It is yet another object of the present invention to provide a coating for ceramic capacitors that will have minimum degradation of the final Q of the capacitor.

It is a further object of the present invention to provide a filled epoxy coating having corona suppression characteristics and a high Q.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependant claims.

For illustrative purposes, the invention will be described in conjunction with the accompanying drawings in which.

Figure 1:
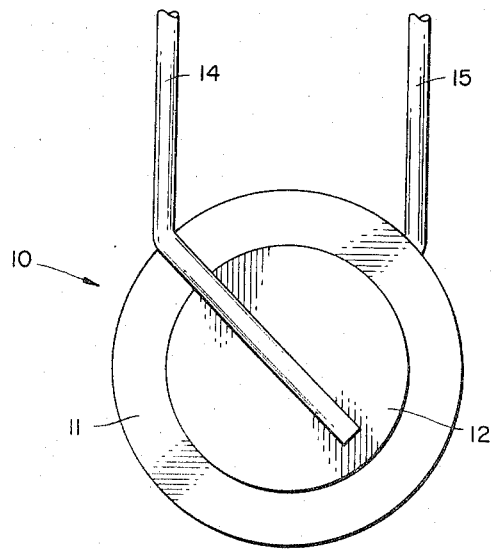
FIGURE 1 is a view of a ceramic capacitor without a coating.

Generally speaking, the present invention is a protective coating for electrical components. In one embodiment, the present invention is a filled epoxy system. The various fillers, in conjunction with the basic epoxy, provides the special and novel features of high Q as well as characteristics which suppress corona. In an application of the coating, the present invention is a ceramic capacitor covered by a coating having a high Q value and means for suppressing corona generated at portions of said capacitor.

Referring now to FIGURES 1 through 4 of the drawing, an application of the coating of the present invention to a ceramic capacitor may be discussed.

A ceramic capacitor 10 comprising a ceramic disc 11, conductive electrode areas 12 and 13 and terminals or lead wires 14 and 15 is shown in FIGURE 1. The ceramic disc 11 is formed of a suitable dielectric material such as barium titanate and the conductive electrode areas 12 and 13 are formed by firing or otherwise depositing a coating of conductive material in defined areas. (The electrode area 13 is not shown in FIGURE 1.) The capacitance value of the capacitor 10 is determined by the area common to the electrode areas 12 and 13 and the dielectric constant and thickness of the ceramic wafer 11.

The terminals 14 and 15 are attached to the electrode areas 12 and 13, respectively, by soldering or other suitable joining techniques.

Figure 2:
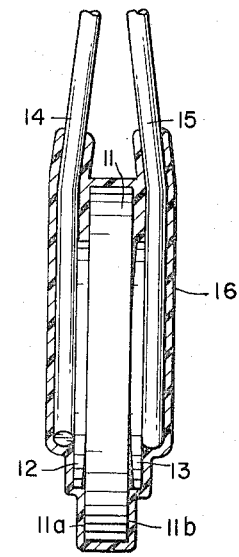
FIGURE 2 is a side view of the capacitor shown in FIGURE 1 covered with the coating of the present invention.

Referring now to FIGURE 2, a side view of capacitor 10 with the coating 16 of the present invention deposited thereon can be discussed. The two faces 11a and 11b of the ceramic disc 11 are substantialy parallel and the electrode areas 12 and 13 are shown oppositely disposed so as to define a "capacitance area" equal to the area of the electrode areas. It can be seen that the electrode areas are slightly smaller than the area of the disc.

An undercoating 16, which is the coating of the present invention, is applied to all surfaces of the capacitor 10 including the portions of the lead wires 14 and 15 close to the ceramic disc 11. When the coating of the present invention is used as an undercoating, the thickness may be very slight. It has been found, for instance, that thicknesses of approximately .005 inch are suitable for many capacitor applications.

Figure 3:
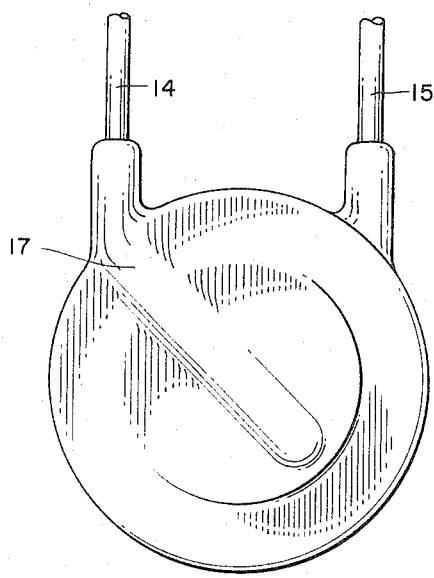
FIGURE 3 is a view of the ceramic capacitor shown in FIGURE 1 with the coating of the present invention and a final protective coating.

Referring now to FIGURE 3, a view of the capacitor 10 with a final protective coating 17 can be seen. The final protective coating 17 is usually added for strength and/or cosmetic purposes and may be phenolic, epoxy or any other suitable insulating and protecting material.

Figure 4:
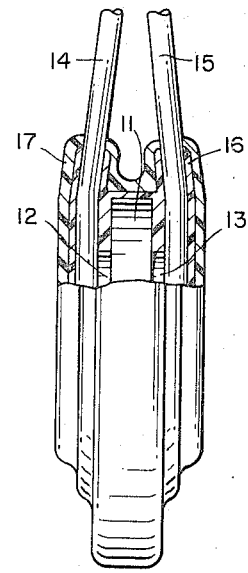
FIGURE 4 is a partially sectioned side view of FIGURE 3.

Referring now to FIGURE 4, a sectional view of the capacitor 10 with the undercoating 16 and final coating 17 may be seen. It can be seen that the final coating 17 has been applied to completely cover the undercoating 16. The final coating 17 forms a bond with the undercoating 16 and, as shown in FIGURE 4, is usually quite a bit thicker than the undercoating. The thickness of the final coating is determined by the structural requirements for the capacitor 10.

The chemical constituents and the percentage by weight of the novel coating of the present invention is given in Table I.

TABLE I.—RANGE OF CHEMICAL COMPOSITION

| Compound: | Weight, percent |
|---|---|
| Butyl glycidol ether ($OCH_2CHCH_2$—O—$CH_3(CH_2)_3$) | 1–15 |
| 170–180 wt./epoxide epoxy resin | 5–20 |
| 400–450 wt./epoxide epoxy resin | 15–30 |
| Dicyandiamide ($NH_2(CNH)$—NHCH) | 1–5 |
| Bentonite ($Al_2O_3 \cdot 4SiO_2 \cdot H_2O$) | 0.1–5 |
| Benzidine yellow | 0.2–2 |
| Calcium carbonate ($CaCo_3$) | 30–60 |
| Xylol (Xylene) ($C_6H_4(CH_3)_2$) | 3–10 |

The above ingredients are combined and milled. Either a ball, pebble or roller mill can be used for this purpose. A typical formulation is given in Table II.

Benzidine yellow is a family of organic azo pigments prepared by coupling the tetrazonium salt of 3,3′-dichlorobenzidine with acetoacetarylides having good brightness, lightfastness and alkali resistance.

TABLE II.—A TYPICAL FORMULATION

| Compound: | Weight percent |
|---|---|
| Butyl glycidol ether | 8.0 |
| 170–180 wt./epoxide epoxy resin | 12.0 |
| 400–450 wt./epoxide epoxy resin | 20.0 |
| Dicyandiamide | 2.5 |
| Bentonite | 2.0 |
| Benzidine yellow | 0.5 |
| Calcium carbonate | 50.0 |
| Xylol | 5.0 |

In order to supress corona created by voltage gradients in electrical components, the suppressing coating must possess free-flowing characteristics so as to penetrate minute cracks and crevices in the component. The coating of the present invention has such characteristics.

The coating of the present invention is far superior to prior art coatings in both reducing electrical noise and/or corona and improving case breakdown on ceramic capacitors without appreciably increasing the dissipation factor of the capacitor. The use of the novel coating of the present invention as a coating for a ceramic capacitor results in a novel, improved ceramic capacitor.

The present invention, as hereinbefore described, is merely illustrative and not exhaustive in scope. Since many widely different embodiments of the invention may be made without departing from the scope thereof, it is intended that all matter contained in the above description and shown in the accompanying drawings shall be interpreted as illustrative and not in a limiting sense.

What is claimed is:

1. A coating for electrical components consisting essentially of from 1–15% by weight of butyl glycidol ether, from 5–20% by weight of 170–180 weight epoxide epoxy resin, from 15–30% by weight of 400–450 weight epoxide epoxy resin, from 1–5% by weight of dicyandiamide, from 0.1–5% by weight of bentonite, from 0.2–2% by weight of benzidine yellow, from 30–60% by weight of calcium carbonate, and from 3–10% by weight of xylol.

2. A coating as in claim 1 consisting of 8.0% by weight of butyl glycidol ether, 12% by weight of 170%180 weight epoxide epoxy resin, 20% by weight of 400–500 weight epoxide epoxy resin, 2.5% by weight of dicyandiamide, 2.0% by weight of bentonite, 0.5% by weight of benzidine yellow, 50% by weight of calcium carbonate, and 5.0% by weight xylol.

3. A ceramic capacitor comprising: a ceramic member having predetermined dielectric characteristics; a pair of electrically conducting areas formed on said member and deposited so as to produce a capacitance determined by the area between said electrically conducting areas and the thickness and dielectric characteristics of said ceramic member; terminal members connected to each of said electrically conducting areas; and a coating having a high Q value and means for suppressing corona generated at portions of said capacitor consisting essentially of from 1–15% by weight butyl glycidol ether, from 5–20% by weight of 170–180 weight epoxide epoxy resin, from 15–30% by weight of 400–450 weight epoxide epoxy resin, from 1–5% by weight of dicyandiamide, from 0.1–5% by weight of bentonite, from 0.2–2% by weight of benzidine yellow, from 30–60% by weight of calcium carbonate, and from 3–10% by weight of xylol, said coating being deposited over said ceramic member said electrically conducting areas and portions of said terminal members adjacent to said ceramic member.

4. A ceramic capacitor as claimed in claim 3, wherein said coating consists essentially of 8% by weight of butyl glycidol ether, 12% by weight of 170–180 weight epoxide epoxy resin, 20% by weight of 400–450 weight epoxide epoxy resin, 2.5% by weight of dicyandiamide, 2% by weight of bentonite, 0.5% by weight of benzidine yellow, 50% by weight of calcium carbonate, and 5% by weight of xylol.

5. A ceramic capacitor as claimed in claim 3, wherein said coating is about .005 inch thick.

6. A ceramic capacitor as claimed in claim 3, wherein said ceramic member is barium titanate.

7. A ceramic capacitor as claimed in claim 3, wherein said coating penetrates into minute cracks and crevices in said ceramic member.

8. A ceramic capacitor as claimed in claim 4, wherein said filled epoxide epoxy resin coating consists essentially of about 8% by weight of butyl glycidol ether, about 12% by weight of 170–180 weight epoxide epoxy resin, about 20% by weight of 400–450 weight epoxide epoxy resin, about 2.5% by weight of dicyandiamide, about 2% by weight of bentonite, about 0.5% by weight of benzidine yellow, about 50% by weight of calcium carbonate, and about 5% by weight xylol.

9. A capacitor comprising: a plate of ceramic material having spaced, aligned and generally parallel faces; generally circular conductive capacitor electrode areas centrally located on each of said spaced faces; terminal leads secured to said electrode areas and extending outwardly on either side of said plate; a first insulating coating having a high Q value and means for suppressing corona generated at portions of said capacitor by said coating consisting essentially of from 1–15% by weight butyl glycidol ether, from 5–20% by weight of 170–180 weight epoxide epoxy resin, from 15–30% by weight of 400–450 weight epoxide epoxy resin, from 1–5% by weight of dicyandiamide, from 0.1–5% by weight of bentonite, from 0.2–2% by weight of benzidine yellow, from 30–60% by weight of calcium carbonate and from 3–10% by weight of xylol, said coating being deposited over said plate, said electrode areas and portions of said terminal members adjacent to said plate; and a second insulating coating entirely covering said first coating.

10. A capacitor as claimed in claim 9, wherein said coating consists essentially of 8% by weight of butyl glycidol ether, 12% by weight of 170–180 weight epoxide epoxy resin, 20% by weight 400–450 weight epoxide epoxy resin, 2.5% by weight dicyandiamide, 2% by weight bentonite, 0.5% by weight of benzidine yellow, 50% by weight calcium carbonate, and 5% by weight xylol.

11. A capacitor as claimed in claim 9, wherein said first insulating coating is about .005 inch thick and said second insulating coating is thicker than said first insulating coating.

12. A capacitor as claimed in claim 9, wherein said ceramic material is barium titanate.

13. A capacitor as claimed in claim 9, wherein said second insulating coating is selected from the group consisting of phenolic and epoxy and wherein said second insulating coating is bonded to said first insulating coating.

14. In combination a ceramic capacitor operable at voltages greater than 500 volts and a filled epoxy resin coating deposited over said capacitor, said coating having corona suppression and high Q value characteristics and consisting essentially of about 1–15% by weight butyl glycidol ether, about 5–20% by weight of 170–180 weight epoxide epoxy resin, about 15–30% by weight of 400–450 weight epoxide epoxy resin, about 1–5% by weight dicyandiamide, about 0.1–5% by weight bentonite, about 0.2–2% by weight benzidine yellow, about 30–60% by weight calcium carbonate, and about 3–10% by weight of xylol.

15. In combination, a ceramic capacitor and a filled epoxy resin coating as claimed in claim 14, wherein said filled epoxy resin coating consists essentially of about 8% by weight of butyl glycidol ether, about 12% by weight of 170–180 weight epoxide epoxy resin, about 20% by weight of 400–450 weight epoxide epoxy resin, about 2.5% by weight of dicyandiamide, about 2% by weight of bentonite, about 0.5% by weight of benzidine yellow, about 50% by weight of calcium carbonate, and about 5% by weight xylol.

16. A ceramic capacitor comprising a ceramic disc means, electrode means on each side of said disc means, lead wire means attached to said electrode means, and a filled epoxide epoxy resin coating deposited over said ceramic disc means and said electrode means for suppressing corona generated by said capacitor and having a high Q value, said filled epoxide epoxy resin coating consisting essentially of about 1–15% by weight butyl glycidol ether, about 5–20% by weight of 170–180 weight epoxide epoxy resin, about 15–30% by weight of 400–450 weight epoxide epoxy resin, about 1–5% by weight dicyandiamide, about 0.1–5% by weight bentonite, about 0.2–2% by weight benzidine yellow, about 30–60% by weight calcium carbonate, and about 3–10% by weight of xylol.

References Cited
UNITED STATES PATENTS

| 3,086,149 | 4/1963 | Baron | 174—52 |
| 3,109,969 | 11/1963 | Seidel | 317—258 |
| 3,251,918 | 4/1966 | Seney | 264—135 |
| 3,254,282 | 4/1966 | West | 317—258 |
| 3,255,395 | 6/1966 | Fabricius | 174—152 |

LEWIS H. MYERS, *Primary Examiner.*

E. GOLDBERG, *Assistant Examiner.*